United States Patent [19]

McCabe et al.

[11] Patent Number: 5,253,566
[45] Date of Patent: Oct. 19, 1993

[54] INFRA-RED DEEP FAT FRYER

[75] Inventors: Mark E. McCabe, Center Barnstead; David R. Nerbonne, Concord; George McMahon, Manchester, all of N.H.

[73] Assignee: Pitco Frialator, Inc., Bow, N.H.

[21] Appl. No.: 956,206

[22] Filed: Oct. 5, 1992

[51] Int. Cl.5 .................. A47J 27/02; A47J 37/12
[52] U.S. Cl. ........................ 99/403; 99/330; 99/411; 126/92 AC; 126/343.5 R; 126/375; 126/391; 431/329
[58] Field of Search ............. 99/330, 403, 406, 410, 99/407, 411, 451, DIG. 14; 126/391, 92 R, 92 AC, 92 B, 92 C, 83, 343.5 R, 343.5 A, 375; 431/326, 328, 329

[56] References Cited

U.S. PATENT DOCUMENTS

| | | | |
|---|---|---|---|
| 3,961,568 | 6/1976 | Jeppson | 99/339 |
| 4,487,117 | 12/1984 | Colley et al. | 99/403 |
| 4,519,770 | 5/1985 | Kesselring et al. | |
| 4,594,941 | 6/1986 | Anderson | 99/407 |
| 4,597,734 | 7/1986 | McCausland et al. | |
| 4,657,506 | 4/1987 | Ihlenfield et al. | |
| 4,704,290 | 11/1987 | Fritzsche | |
| 4,895,137 | 1/1990 | Jones et al. | 126/391 |
| 4,913,041 | 4/1990 | Taber et al. | |
| 5,033,368 | 7/1991 | Brewer | 99/330 |
| 5,038,753 | 8/1991 | Yokoyama | 126/391 |
| 5,050,582 | 9/1991 | Almond et al. | |
| 5,101,806 | 4/1992 | Hunt et al. | 431/329 |
| 5,146,843 | 9/1992 | Fuller et al. | 99/403 |
| 5,174,273 | 12/1992 | Oiwa | 99/403 |
| 5,184,539 | 2/1993 | Oiwa | 126/391 |
| 5,186,097 | 2/1993 | Vaseloff et al. | 99/330 |

*Primary Examiner*—Timothy F. Simone
*Attorney, Agent, or Firm*—Lowe, Price, LeBlanc & Becker

[57] ABSTRACT

A deep fat fryer is described which is heated by burner tubes extending through the central portion thereof and by burners therein which are metal mesh. The burners support combustion only on the surface so that the primary heat source is infra-red energy to the burner tubes. Exhaust gases from the burner tubes are circulated around sides and upper portion of the fryer only so that the central and upper portions of the tank are heated and the lower portion serves as a sump.

7 Claims, 3 Drawing Sheets

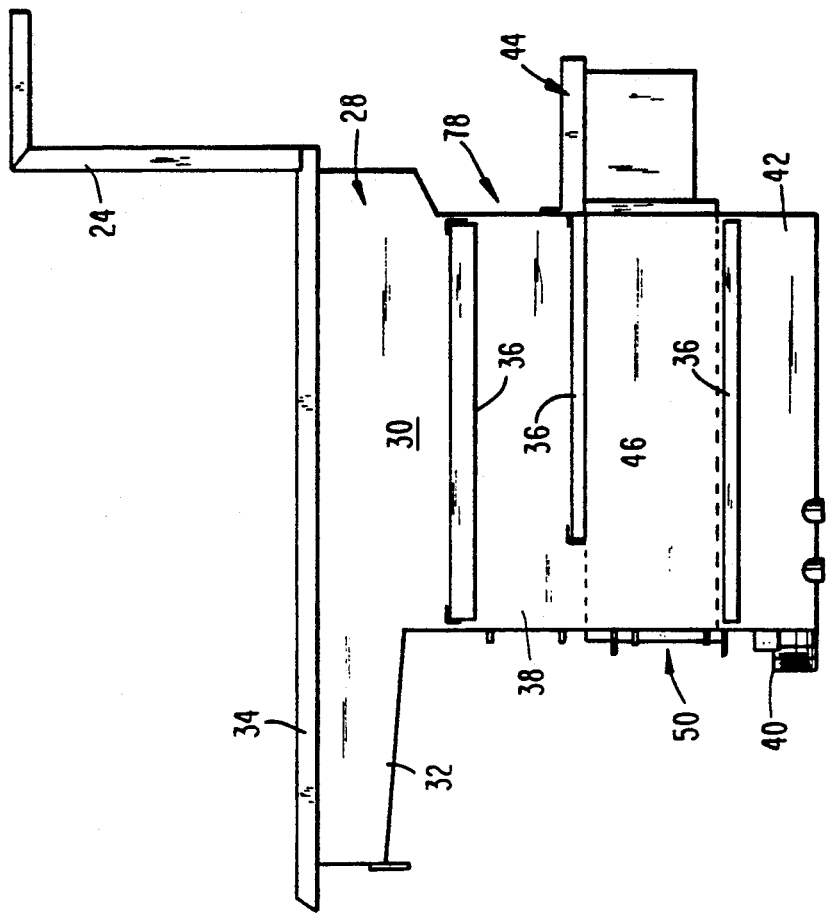
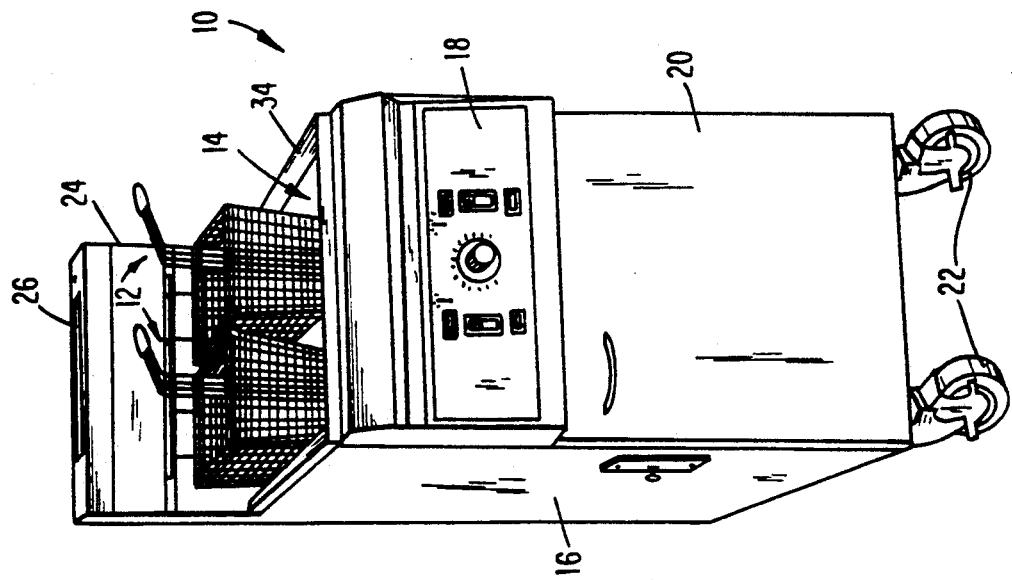

INFRA-RED DEEP FAT FRYER

FIELD OF THE INVENTION

This invention relates to deep fat fryers and in particular to a deep fat fryer which uses an infra-red heat source.

BACKGROUND OF THE INVENTION

Deep fat fryers as commonly used commercially in, for example, fast food restaurants, must be capable of producing food of uniform quality, rapidly, and with an efficient utilization of fuel. In addition, such fryers must be constructed so that they can be easily serviced and cleaned.

Uniform heating conditions including a rapid response to a sudden drop in temperature have continued to be a problem in fryer design. As is well known, if the food to be cooked is frozen, when a basket is submerged in the heated oil, the oil will dramatically drop in temperature, and therefore excess heat will be required. Once the oil is returned to cooking temperature, the heat input must be controlled so that desired cooking conditions are not exceeded. It is desired, then, to design a deep fat fryer which will make maximum utilization of the heat input available so that when temperature conditions drop suddenly, the conditions can be returned to desired cooking conditions as rapidly as possible.

U.S Pat. No. 4,913,041 there is described a deep fat fryer which utilizes a dual gas fired burner assembly wherein hot combustion gases generated by the gas fired burners are permitted to flow through oil heating passages which are formed around suitable exterior surfaces of the fry pot well section or sections. As the hot combustion gas from the burner structure flows through metal heating passages, a significant portion of the available combustion gas heat is unavoidably diverted into the mass of metal used to form the heating passages in conjunction with which the fry pot walls are actually heated. Therefore, only a portion of the available gas heat is transferred inwardly. In that patent, then, it was intended to provide a fry pot with spaced well sections disposed on either side of a dual gas burner assembly. Exhaust gases from the burner assembly are discharged into a heating cavity before passing into an exhaust stack system, and insulation is also utilized to maximize the heat input to the oil. The depending well sections then are oil heating sections with the cooking pot being disposed above so that as heated oil rises, the cooler oil flows downward into the heating section. The burners described are ceramic radiant burners of conventional design.

In U.S. Pat. No. 5,050,582 cylindrical burners are used which are disposed in oblong tubes which extend through the oil tank and the exhaust gases are allowed to flow behind and under the lower portion of the tank before exiting through a flue. In flowing behind and under the bottom of the tank, a dual flow system is arranged with baffles so that maximum heat can be extracted from the exhaust gases. However, the combustion tubes extend through the lower portion of the tank and the recirculating flue gases are also disposed below and behind the tank whereby the portion of the tank exposed to the hot exhaust gases from a heat exchange standpoint is relatively small and remote from the cooking area. In addition, the heat source is described as a power burner in a combustion tube which is a relatively inefficient means for delivering heat to the tank.

One further apparatus for deep fat frying is described in U.S. Pat. No. 4,704,290. In this patent, the oil from the tank is circulated through an external heat exchanger in a pipe system and then returned to the cooking tank. In this way, the heat exchange can be controlled and the process does not depend upon convection currents for raising heated oil from the bottom of a tank to be replaced by cooled cooking oil from the top of the tank. In this instance, the oil is pumped through the heat exchanger and then returned to the upper portion of the tank. This procedure, of course, requires piping apparatus that must be cleaned to avoid fouling and, therefore, provides a maintenance problem in the system used to circulate the hot oil between the tank and the heat exchanger. A conventional burner is used as a heat source in the heat exchanger.

As is well known, heat from an open flame and a conventional boiler fire tube generally heats by convection currents. In an effort to increase the efficiency of such fire tubes, it was proposed to provide a ceramic shell or cylinder constructed of a porous matrix of ceramic fibers which would surround the flame. The purpose of such a construction would be to generate infra-red energy. See, for example, U.S. Pat. No. 4,519,770.

Ceramic fire tubes, however, are fragile and brittle and have been found to be difficult to maintain.

It was also described in U.S. Pat. No. 4,657,506 to provide a cylindrical metal member which is surrounded by a woven fabric of stainless steel. The fabric provides a porous surface so that a fuel air mixture admitted to the interior of the metal cylinder would pass outwardly through holes in the side thereof and through the metal fabric where it could be ignited. Such metal units, however, were relatively short lived because of oxidation and generally used a spark igniter. The spark igniter is subject to generation of unwanted electromagnetic energy would could interfere with adjacent instruments.

Although a porous ceramic matrix was insufficiently durable, and a porous stainless steel matrix oxidized too quickly, in U.S. Pat. No. 4,597,734 there was described an acceptable metal alloy, porous mesh burner. That burner in one embodiment was generally cylindrical having an axial plug. A fuel air mixture was released into the annular space between the plug and the matrix which would filter through the porous matrix to be ignited. The result was a radiant burner with the ability to withstand both oxidation and corrosive conditions as well as thermal shock. The alloy utilizes a yttrium component which was responsible for binding a coating of alumina formed on the metal surface to the metal. The alumina coating then provides resistance to high temperature corrosion and further oxidation. In the preferred embodiment, the mesh is centered for stability. Major ingredients are iron, chromium and aluminum, in addition to yttrium, silicon and carbon.

SUMMARY OF THE INVENTION

Accordingly, it was discovered that a highly efficient deep fat fryer can be provided utilizing primarily a surface burning radiant infra-red energy source in tubular form. The device of this invention utilizes the infra-red heat source to heat the interior surface of a burner tube, primarily by infra-red and convection heat. The exhaust gases then are circulated around and above the tubes in order to further exchange the heat therein to maximize the efficiency of the device of this invention.

The heat source preferred is a iron, chromium, aluminum and yttrium alloy burner which is a cylindrical sintered mesh wherein a fuel air mixture is released axially and filters through the mesh to be ignited by a hot surface igniter, rather than by a spark. Upon ignition, then, the mesh itself is heated to generate infra-red energy. The burner of this invention then is efficient, durable, and can be ignited without using a spark.

Accordingly, it is an object of this invention to provide a deep fat fryer which is both fast cooking and efficient in that it uses as a primary heat source infra-red radiation.

It is a further object of this invention to provide a dual heat source in the form of cylindrical tubes extending into a deep fat fryer which tubes contain burners employing a porous mesh of a metal alloy consisting of iron, chromium, aluminum and yttrium which is heated by a fuel air surface ignited mixture and which unit also utilizes the sensible heat in exhaust gases by circulating the exhaust gases around and above the burner tubes to maximize the heat exchange with the hot fat containing tank.

It is another object of this invention to provide heat source in an infra-red deep fat fryer which maximizes the available heat generated by surface ignited infra-red radiant burners and a method which fully utilizes the sensible heat in the exhaust gases formed by circulating said gases around the tank both above and below the tubes containing the radiant heaters.

These and other objects will become readily apparent with reference to the drawings and following description wherein:

BRIEF DESCRIPTION OF THE DRAWING

FIG. 1 is a perspective view of the device of this invention.

FIG. 2 is a side view of the device of this invention with the outer shell removed.

DETAILED DESCRIPTION OF THE INVENTION

Figure 4:
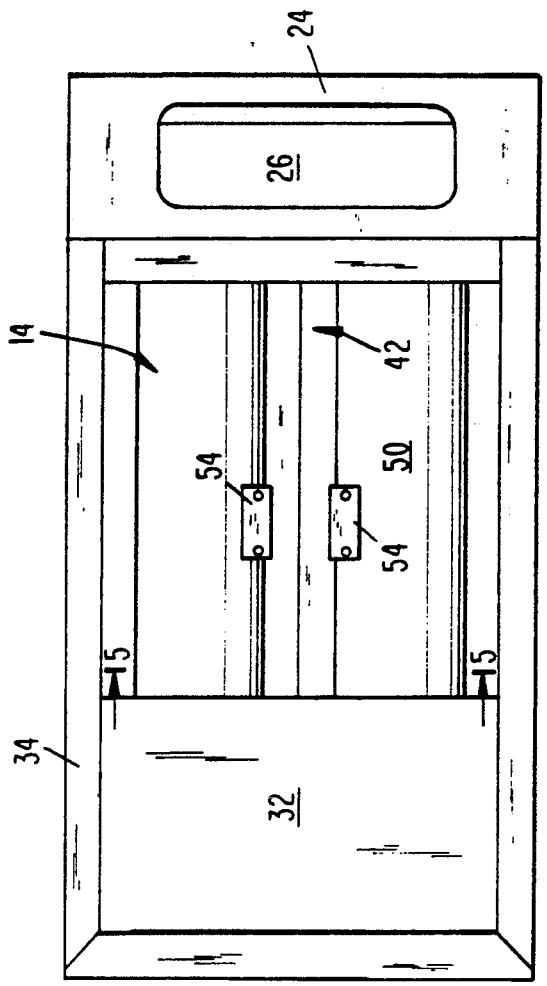
FIG. 4 is a top view of FIG. 2.

With attention to the drawings and to FIGS. 1 and 2, in particular, the deep fat fryer of this invention 10 is from outward appearance of conventional design. The fryer 10 includes preferably a pair of baskets 12 which can be lowered into the tank portion 14 for cooking. The device generally consists of an outer shell 16 which has a control panel 18, preferably on the front portion thereof, and an access door 20 as will be subsequently explained. The device may also have optional wheels 22 so that it may be moved. In addition, as also will be subsequently explained, a stack 24 is provided which has an outlet 26 for flue gases. The outlet 26 could be vented into a conventional stack or hood type arrangement if desired.

The outer shell 16 houses a jacketed inner shell 28. Inner shell 28 provides tank 30 for receiving one or both of the baskets 12, preferably with a deck 32 on the front portion thereof, and a lip 34 surrounding the tank portion 30 and deck 32. Spacer baffles which may be channels 36 are provided on the sides 38 of the inner shell 28 to separate the inner shell side 38 from jacket 37 which in turn is surrounded by the outer housing side 16. (See FIG. 3.) Inner shell 28 is further provided with a bottom drain 40 from a sump 42 and an exhaust baffle assembly 44. Burner tubes as will be subsequently explained are housed within shell 28 at the lower portion 46 immediately below the tank 30.

Figure 5:
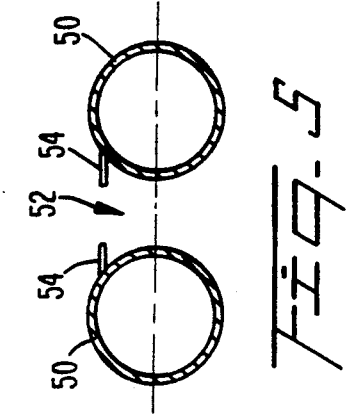
FIG. 5 is a cross sectional view taken along the lines 55 of FIG. 4.
Figure 3:
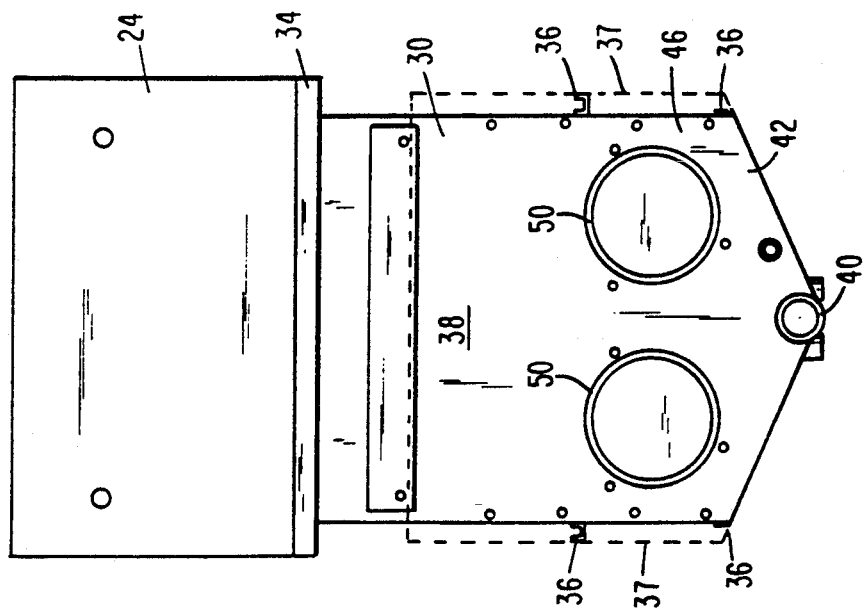
FIG. 3 is a front view of FIG. 2 with the jacket added (in phantom) on the sides of the inner shell.

With attention to FIGS. 3–5, the inner shell 38 has an upper tank portion 30, a lower heating portion 46, and a sump portion 42 below the heating section 46 which houses drain outlet 40. Heat is provided at two burner cylinders or tubes 50 which tubes extend through the lower portion 46 of inner shell 38. Burner tubes 50 are spaced apart and in general are intended to divide the cooking tank area 30 from the sump area 40 wherein food particles and the like collect for removal. The source of heat mounted in the burner tubes 50 will be separately described below. As shown, FIGS. 4 and 5, the tubes extend through the tank and are separated by an opening 52 therebetween. Thermal bulbs 54 may optionally be provided for monitoring the heat generated in the conventional fashion.

In summary, then, when the tank 14 contains oil, the cooking oil or fat fills the tank surrounding the burner tubes 50. Oil heated in the area adjacent the burner tubes 50 will rise whereas oil cooled at the top as when food in baskets 12 is submerged in the tank portion 30 will drop. The cooked oil then falls to the bottom to be reheated and recirculated and the food particles entrained therein fall by gravity into the sump portion 42 for collection. Sump portion 42 necessarily is cooler than the heating area 46 to eliminate or minimize fat breakdown or taste transfer from the cooked or charred food particles retained in the sump 42.

As will be obvious to those skilled in the art, drain 40 will be closed by a conventional valve so that when the tank 14 is intended to be emptied, a conduit may be attached to the outlet 40 and the oil drained by gravity into a used oil container (not shown) for removal.

Figure 7:
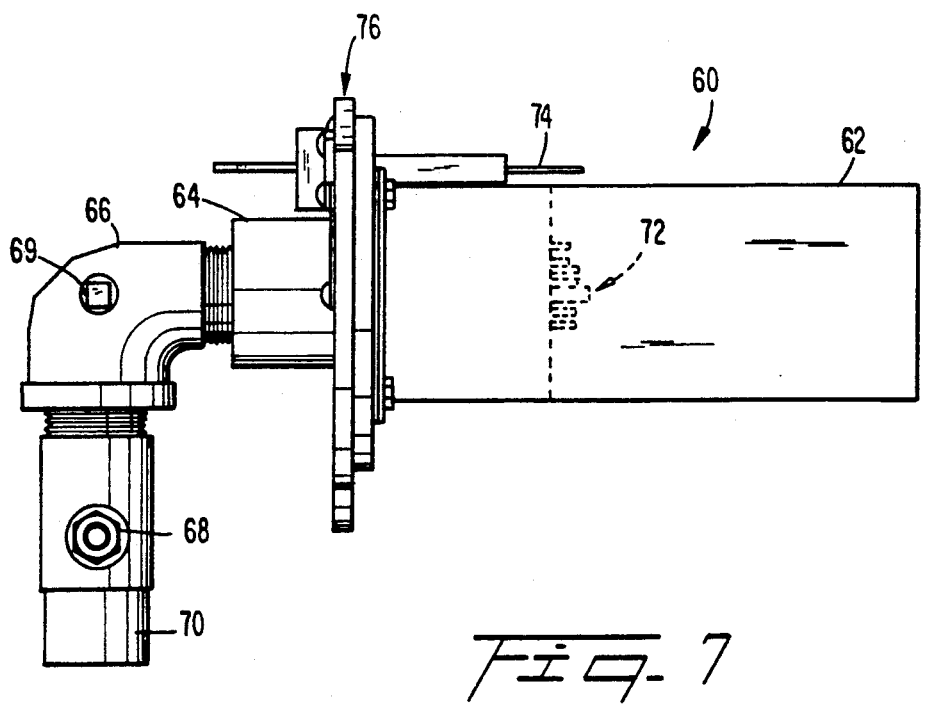
FIG. 7 is a side view of the radiant heater with surface igniter.

The heat source for the device of this invention is a unique infra-red burner whereby the heat is generated primarily by infra-red radiation and convection currents, rather than conduction from a burning fuel. With attention to FIG. 7, each burner 60 which is mounted in burner tubes 50 comprises a mesh cylinder similar to that described in U.S. Pat. No. 4,597,734 and obtainable from N.V. Acotech S.A. of Zwevegem, Belgium. The burner is generally described as a metal fiber burner but it consists of a mesh formed of a specific chromium, iron and aluminum alloy with yttrium present so that as combustion occurs, the alumina formed will be bound to the metal surface and will protect the metal surface from further oxidation. The fibrous structure is a nonwoven mesh which has been sintered for strength so that the burner cylinder 62 may be a mesh self supporting body, or may be a thinner mesh supported by a foraminous metak skin.

The source of fuel is preferably natural gas, or propane, and is admitted through a conduit 64. The conduit 64 is fed by a pipe 66 which is connected both to a source of gas at inlet 68 and air under pressure at inlet 70. Reference 69 shows an optional test outlet. The pressure preferred is moderate and, typically, a one-eighth horse power blower will be sufficient. The air gas mixture then is admitted to the interior of cylinder 62 at a plurality of inlet ports 72. The air gas mixture then filters through the permeable surface of the mesh cylinder 62 and is ignited, preferably by a hot surface igniter 74. Hot surface igniter 74 is not a spark igniter but rather a resistance type element which can achieve a very high temperature in a very short period of time. Such devices are available through, for example, Norton Advanced Ceramics of Worcester, Mass. The igniters operate on a relatively low wattage and have the ability of igniting the burners without spark generation. Spark generation has been found to interfere with control apparatuses as is well known.

When ignited, the fuel air mixture then burns at the surface of the porous mesh cylinder 62 heating the surface to emit infra-red radiation within each burner tube 50. As noted above, then, the primary source of heat is via infra-red radiation, as well as convection currents used in conventional fryer structures.

It will be noted that the inner shell 28 has a front portion 76 which mounts, as described above, the burner tubes 50 and associated burners 62. In order to accommodate conduit 64 and pipe 66, and the other associated electrical wiring, the front portion 76 of inner shell 28 is spaced back away from door 20 in outer shell 16. In addition, as noted above, the drain port 40 is also in the spaced back front portion of inner shell 16. Access to the burner tubes 50 for maintenance and cleaning and to drain port 40 is then provided through the door 20 at the front of the device 10 of this invention.

Figure 6:
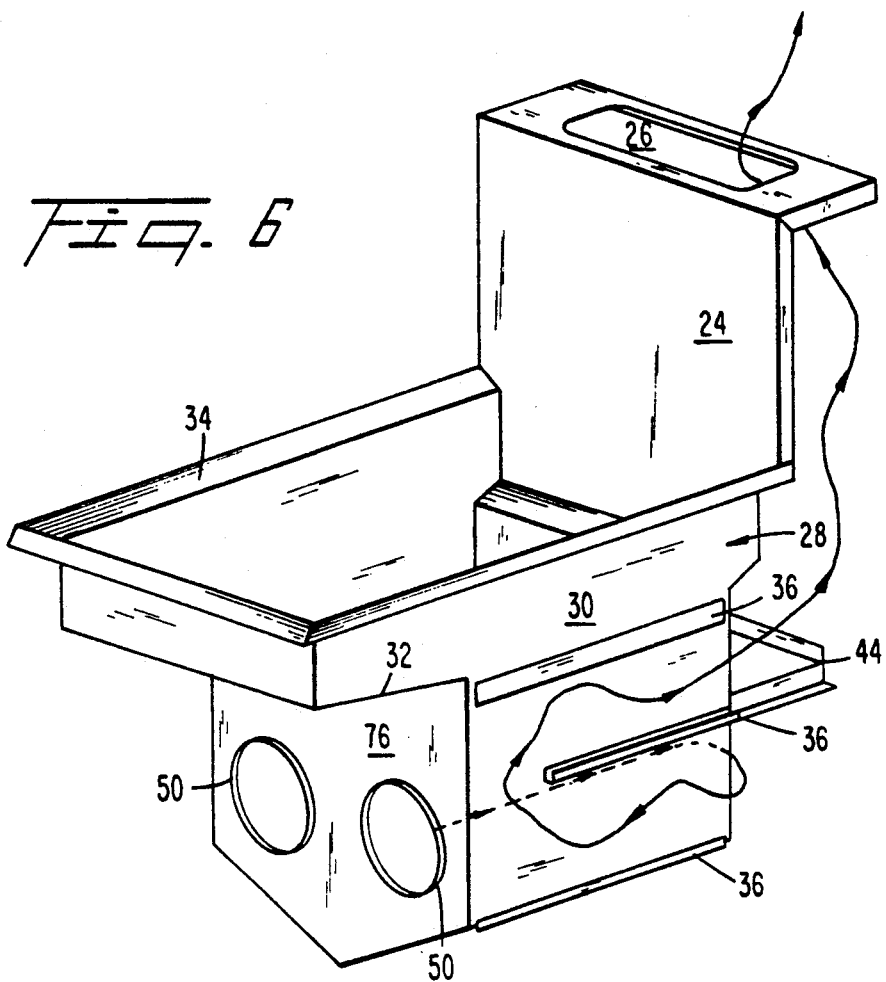
FIG. 6 is a view similar to FIG. 2 but illustrating the flow of exhaust gases around the tank.

The inner shell sides 38 also are spaced away from the jacket sides 37 by spacer channels 36 and the rear of the inner shell 28 is further spaced back from the rear of the outer shell (not shown). The result is that exhaust gases exiting the burners 62 and burner tubes 50 follow a path as shown in, for example, FIG. 6 wherein they are diverted by diversion baffle 44 between the sides of the inner shell and the jacket whereupon they circulate forwardly and then upwardly through an opening provided in the central channel 36 as shown in FIG. 6. The exhaust gases then circulate upwardly around the tank 30 and towards the rear whereupon they enter the flue (not shown) at the back of the tank portion 30 and ultimately exit through outlet 26 in flue stack 24.

The hot flue gases, then, are circulated both forwardly and rearwardly along the sides of the upper portion of the tank 30 above the heating portion 46 so that heat may be absorbed from said gases before they are exhausted through the stack 24. This, then, maximizes the utilization of the heat from the burners whereby the primary source is infra-red radiation, but the convection currents generated are also used in heat exchange capacity with the cooking portion of the tank to heat at least the sides, rear and upper portion thereof. It has been found that this structure is much more efficient than conventional structures wherein the exhaust gases pass below the tank in that it permits the sump area to remain relatively cool whereby food particles therein can be retained with a minimum of breakdown but the heat can be still be recaptured in the tank portion where it can be more readily utilized.

Accordingly, the deep fat fryer of this invention maximizes the utilization of radiant infra-red energy in burner tubes which extend through the tank portion whereby the tank itself will be divided into three zones. In the upper zone, cooking occurs. As is well known to those skilled in the art, when the uncooked food in baskets is lowered into the upper portion, there is an immediate temperature drop in the oil. The heating central portion below the tank portion, then, surrounds the burner tubes and starts a heat circulation whereby heated oil from adjacent the burner tubes circulates upwardly or rises and cooled oil circulates downwardly to be reheated. In addition, food particles therein may drop through the intermediate or central heating portion because the burner tubes are spaced away from each other to permit passage therebetween so that food particles may drop by gravity into the lower sump portion where they are retained until the tank is drained for cleaning.

The burner tube of this invention is most preferably the metal mesh described above. It is possible to use ceramic type of cylindrical surface burners. However, the ceramic cylinders are brittle and often break when being serviced. The metal mesh burner tubes, as described above, which do not deteriorate from surface oxidation, then are much more efficient and durable. As will be obvious to those skilled in the art, an annular space is provided between the burners 62 and the inner surface of the burner tubes 50 so that heating is by radiation and by convection, and not by conduction.

The unique circulation system of this invention, then, coupled with the infra-red heat source maximizes the heat content of the fuel utilized whereby rapid and efficient cooking may be achieved on a commercial scale.

The invention may be embodied in other specified forms without departing from the spirit or essential characteristics thereto. The present embodiments are therefore to be considered in all respects as illustrative and not restrictive, the scope of the invention being indicated by the appended claims rather than by the foregoing description, and all changes which may come within the meaning and range of equivalency of the claims are therefore intended to be embraced therein.

What is claimed is:

1. A deep fat fryer comprising:
    an inner shell having a front, sides and back and defining a tank having an upper cooking portion, a central heating portion and a lower sump portion, a pair of mutually spaced tubes extending through the central portion thereof and opening through the front and back of said shell, the sides of said sump portion tapering to an outlet port in the front of said shell;
    an outer shell surrounding and spaced away from corresponding portions of said inner shell, a jacket surrounding the sides and back of the central portion of said inner shell and disposed between the sides and back of said inner and outer shells, the back of said jacket forming a stack to receive exhaust gases;
    a pair of cylindrical infra-red surface burners, each mounted in one of said tubes and having an external surface spaced away from the internal surface of said tube, each burner comprising a porous, sintered metal mesh cylinder means coupled to the front of each burner for admitting a pressurized fuel air mixture into the interior of said cylinders and means for igniting said mixture at the external surface of said cylinders, whereby the heat of combustion radiates from said mesh cylinders heating said tubes and exhaust gases are expelled from the back of said tubes, circulating baffle means disposed between said inner shell and jacket for circulating hot exhaust gases expelled from said tubes around the sides of the central portion of said tank from the rear to the front and around the sides of the upper portion from the front to the rear and then returned to said stack for heating said portions of said tank therewith, the front portion of said inner shell being spaced away from the front portion of said outer shell and door means in the front portion of said outer shell to define a compartment therebetween for access to said burners and sump outlet port.

2. The fryer of claim 1 wherein said igniting means is an electrical non sparking igniter.

3. The fryer of claim 2 wherein the burner cylinders are a metal alloy mesh resistant to surface oxidation deterioration.

4. The fryer of claim 3 wherein the mesh alloy contains iron, aluminum, chromium and yttrium.

5. The fryer of claim 1 wherein the upper cooking portion of the inner shell defines an upwardly opening cooking area and a drain board portion connected to the front portion of said outer shell.

6. The fryer of claim 5 wherein the central and upper portions of said inner shell only are heated directly by said burners and circulating exhaust gases and the lower sump portion communicates with the middle and upper portions of said tank through an opening between said tubes.

7. The fryer of claim 3 wherein the metal mesh is non woven.

* * * * *